United States Patent
Cardei et al.

(10) Patent No.: US 10,067,029 B2
(45) Date of Patent: Sep. 4, 2018

(54) SYSTEMS AND METHODS FOR ESTIMATING MODULATION TRANSFER FUNCTION IN AN OPTICAL SYSTEM

(71) Applicant: Google LLC, Mountain View, CA (US)

(72) Inventors: Vlad Constantin Cardei, Redwood City, CA (US); Boyd Albert Fowler, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/290,313

(22) Filed: Oct. 11, 2016

(65) Prior Publication Data

US 2017/0234765 A1  Aug. 17, 2017

Related U.S. Application Data

(60) Provisional application No. 62/294,786, filed on Feb. 12, 2016.

(51) Int. Cl.
  *G01M 11/00* (2006.01)
  *G01M 11/02* (2006.01)
  *G06T 7/13* (2017.01)
  *G06T 7/00* (2017.01)

(52) U.S. Cl.
  CPC ....... *G01M 11/0292* (2013.01); *G06T 7/0085* (2013.01); *G06T 7/13* (2017.01); *G06T 2207/30168* (2013.01); *H05K 999/99* (2013.01)

(58) Field of Classification Search
  CPC .... G01M 11/0292; G06T 7/0085; G06T 7/13; G06T 7/44
  See application file for complete search history.

(56) References Cited

U.S. PATENT DOCUMENTS

| | | | |
|---|---|---|---|
| 5,191,621 A | 3/1993 | Brok | |
| 7,499,600 B2 | 3/2009 | Ojanen et al. | |
| 2005/0276513 A1* | 12/2005 | Ojanen | G06T 7/0002 382/286 |
| 2010/0098293 A1* | 4/2010 | Chandraker | G06K 9/32 382/103 |
| 2014/0350801 A1* | 11/2014 | Bonefas | A01D 43/087 701/50 |
| 2016/0260210 A1* | 9/2016 | Gonz Lez | G06K 9/6218 |

FOREIGN PATENT DOCUMENTS

JP   2015094701 A   5/2015

OTHER PUBLICATIONS

Office Action from Related United Kingdom Patent Application No. GB1621558.4, dated May 24, 2017, 6 pages.
Kenichiro Masaoka et al., "Modified slanted-edge method and multidirectional modulation transfer function estimation"; published Mar. 6, 2014, OSA, vol. 22, No. 5; DOI:10.1364/OE.22.006040; Optics Express 6046.

* cited by examiner

*Primary Examiner* — Ping Hsieh
(74) *Attorney, Agent, or Firm* — Fish & Richardson P.C.

(57) ABSTRACT

A method of determining a modulation transfer function (MTF) for an image includes receiving an image captured through the optical system, performing edge detection on columns or rows in the image to calculate a plurality of edge points, calculating a plurality polynomials to fit to the calculated edge points, each of the plurality of polynomials varying in degree, selecting a polynomial from the plurality of polynomials to represent the detected edge, and estimating the MTF based on the selected polynomial.

16 Claims, 5 Drawing Sheets

Synthetically generated circular edge
FIG. 1

MTF of synthetically generated circular edge
FIG. 2

Straight Edge
FIG. 3

MTF of straight edge
FIG. 4

Circular edge
FIG. 5

MTF of circular edge
FIG. 6

Polynomial edge 1
FIG. 7

MTF of polynomial edge 1
FIG. 8

*Polynomial edge 2*

FIG. 9

*MTF of polynomial edge 2*

SYSTEMS AND METHODS FOR ESTIMATING MODULATION TRANSFER FUNCTION IN AN OPTICAL SYSTEM

BACKGROUND

In the technological field of optical systems, optical designers commonly compare performance among systems based on a measurement known as the modulation transfer function (MTF) of the system. MTF is one of the best tools available to quantify the overall imaging performance of a system in terms of resolution and contrast and is widely used to evaluate optical components as simple as a spherical singlet lens and as complex as a multi-element telecentric imaging lens assembly. The ISO 12233 standard is the most common method for determining the MTF of an optical system. However, ISO 12233 fails to produce accurate MTF estimates under various conditions, for example, when applied to highly distorted images.

BRIEF SUMMARY

According to an embodiment of the disclosed subject matter, a new method of determining a modulation transfer function (MTF) for an image, comprises performing edge detection on rows in the image to calculate a plurality of edge points, calculating a plurality polynomials to fit to the calculated edge points, each of the plurality of polynomials varying in degree, selecting a polynomial from the plurality of polynomials to represent the detected edge, and estimating the MTF based on the selected polynomial.

According to another embodiment of the disclosed subject matter a system comprises a memory storing instructions, a processor configured to execute a process on a digital image captured by an optical system based on the instructions, the process including the operations of: performing edge detection on columns or rows in the image to calculate a plurality of edge points, calculating a plurality polynomials to fit to the calculated edge points, each of the plurality of polynomials varying in polynomial degree, selecting a polynomial from the plurality of polynomials to represent the detected edge, and estimating the MTF based on the selected polynomial.

According to an embodiment of the disclosed subject matter, means for determining a modulation transfer function (MTF) for an image, comprises performing edge detection on rows in the image to calculate a plurality of edge points, calculating a plurality polynomials to fit to the calculated edge points, each of the plurality of polynomials varying in degree, selecting a polynomial from the plurality of polynomials to represent the detected edge, and estimating the MTF based on the selected polynomial are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosed subject matter may be practiced without these specific details, or with other methods, components, materials, etc. In other instances, well-known structures and devices are shown in block diagram form to facilitate describing the subject disclosure.

Modulation transfer function (MTF) is one of the most important parameters by which image quality is measured. Optical designers and engineers frequently refer to MTF data, especially in applications where success or failure is contingent on how accurately a particular object is imaged. The ISO 12233 standard fails to provide accurate MTF results for optical systems under several important imaging conditions and, in some instances, fails to produce any result at all. For example, the standard is not accurate in measuring MTF based on highly distorted images. This type of image is often captured, for example, by wide field of view (WFOV) cameras. In WFOV cameras, barrel distortion caused by the lens makes straight edges in the object plane become curved in the image plane. Distorted images are problematic for the ISO 12233 standard, which primarily relies on straight edges in the image plane to estimate MTF. As will be shown below, image distortion can result in complications so severe that the ISO 12233 standard cannot be used.

It is possible to measure MTF from examining and analyzing an optical system directly, however, in many instances the optical system is not available for inspection, only images taken by the optical system are accessible. When the image is too distorted to use ISO 12233, one conventional technique is to undistort the image digitally using a computer and apply ISO 12233 to the altered image. However, digital undistortion introduces artifacts and results in measuring MTF of a processed image instead of the original image, which lowers the accuracy of the calculation. Another conventional technique is to attempt to capture an image of something that is curved in the opposite direction of the natural curve present in the barrel distortion of the image in order to achieve a straight edge. However, this method is time consuming and requires trial and error.

The disclosed invention provides a significant improvement to the optical systems technological field by providing a way to determine highly accurate MTF of an optical system based on images that previously were extremely problematic to use by conventional methods. The embodiments disclosed herein provide a novel, improved approach to determine MTF, even from a distorted image. A set of polynomials, each with a different polynomial degree, is created to estimate an edge detected in the image. From among this set, a polynomial is selected and used to estimate the MTF, resulting in a more accurate figure than conventional techniques.

Figure 12:
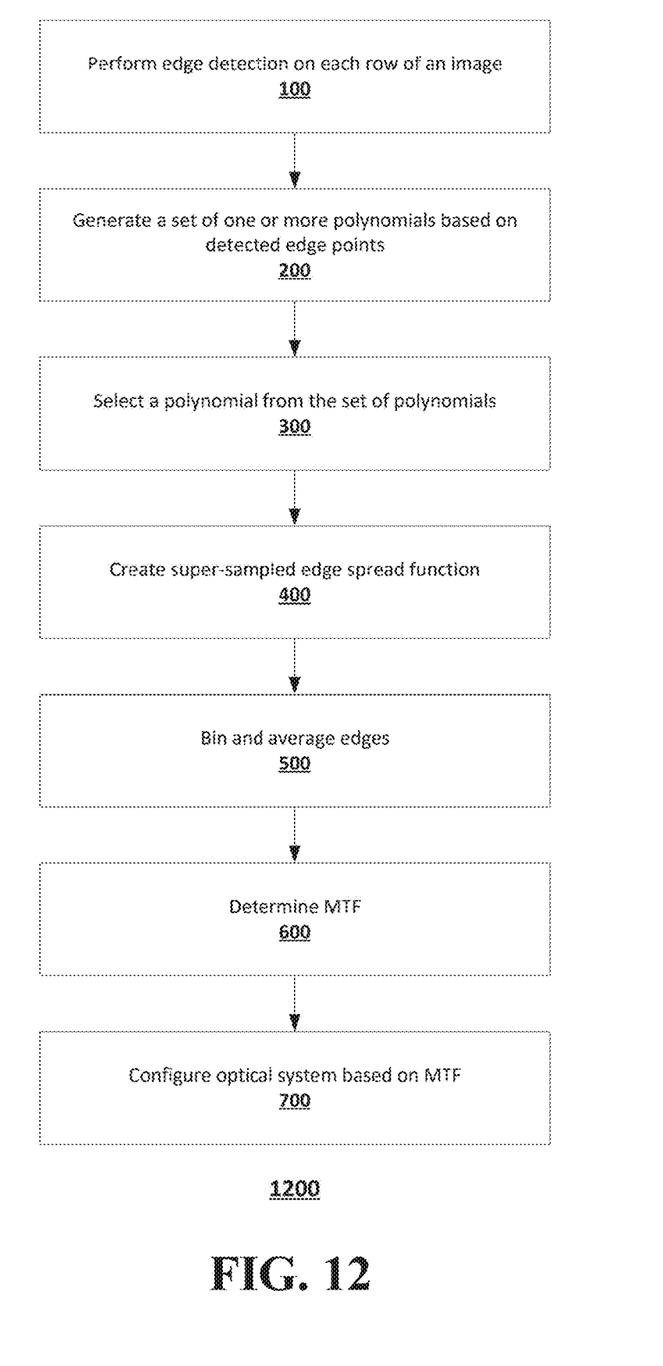
FIG. 12 shows a flowchart process for determining MTF according to an embodiment of the disclosed subject matter.

The technique disclosed herein will be referred to as a free form (FF) MTF algorithm. FIG. 12 shows an flowchart 1200 example of the FF MTF algorithm. At operation 100, edge detection is performed on each row of an image, for example, using a technique such as Canny edge detection, or a modified, less complex Canny edge detection technique. In the modified Canny edge detection, edge detection is run on each image row independently. Each row is differentiated (x'(i)=x(i+1)−x(i)). The resulting data is the gradient along the image row. The differentiated data is then smoothed with a (Gaussian) low-pass filter. The data is then thresholded with an adaptive noise level (any value less than some value is set to 0). This thresholded data is then normalized 0-to-1. This Canny-like edge profile is computed for all rows in the region of interest where we compute the MTF (in the steps above). Edges can be computed on image columns, for example, to determine a vertical MTF.

At operation 200, edge points that were estimated in operation 100 are used to generate one or more polynomials that are used to improve the edge position accuracy. At operation 300 the algorithm selects a polynomial from the set of one or more polynomials. This can be done by analyzing residual errors in each polynomial fit. As the edge fit polynomial degree is increased, the residual errors decrease. When the residual error is plotted as a function of the polynomial degree it falls quickly and then flattens out, eventually dropping to 0. A polynomial is selected to estimate the edge by attempting to select the highest degree polynomial without over fitting. This is done by estimating when over fitting has occurred by measuring the difference in the residual errors of successive polynomial fits. When this value is less than a threshold amount, the algorithm determines that over fitting has occurred. The selected polynomial can have a degree at least higher than a second degree.

It should be noted that for N rows (and implicitly N points), an N−1 degree polynomial will perfectly fit all points, with zero residual error. However, a perfect fit is detrimental to computing an accurate MTF, due to over-fitting of the data. To avoid selecting an over-fit polynomial, an MTF curve can be computed for each polynomial to determine the extent of the detrimental effect of over-fitting.

In operation 400, each row is shifted by an amount determined by the polynomial to create a super-sampled edge spread function. This super-sampled edge spread function can be compatible with the ISO12233 standard. At operation 500 the edges are binned and averaged based on their position. The data can be binned such that the super-sampled line spread function has a higher resolution than the original row data in the image. For example, the resolution can be at least four times the resolution of the original row data. At operation 600 the super-sampled line spread function is differentiated, windowed by a hamming filter and finally Fourier transformed and normalized to determine the MTF. At operation 700 the optical system configuration can be adjusted based on the MTF.

A pseudo code example embodiment of the disclosed algorithm is shown below in Algorithm 1. The computational complexity of the disclosed algorithm is O(num columns*(num rows)$^2$), where num columns is the number of columns in the image and num rows is the number of rows in the image:

---
Algorithm 1
---

```
idata = Read image data;
for i ← 1 to num rows do
    diff(idata(i,:));
    filter idata(i,:) with Gaussian kernel;
    Set all values of idata(i,:) less a threshold to zero;
    edgeEst(i)= centroid of idata(i,:);
end
for j ← 1 to num rows −1 do
    p = coefficients of polyfit degree i to
    edgeEst; error(i) = calc fit errors of p given
    edgeEst; edgeEst2 = polyval(p,[1:num
    rows]); binData(1:4,1:num columns) = 0;
    binCount(1:4) = 0;
    for j ← 2 to num rows do
        binData(edgeEst2(j) mod 4,:) += barrel shift idata(j,:)
        by edgeEst2(j);
        binCount(edgeEst2(j) mod 4)++;
    end
    for j ← 1 to 4 do
        binData(j,:) = binData(j,:)/binCount(j);
    end
    for j ← 1 to 4 do
        lsf(j:4:4*num columns) = binData(j,:);
    end
    MTF = fft(hamming filtered lsf);
    if i > 1 and abs(error(i) - error(i−1)) < threshold
        then
            return MTF;
    else
            continue loop;
    end
end
```

Figure 1:
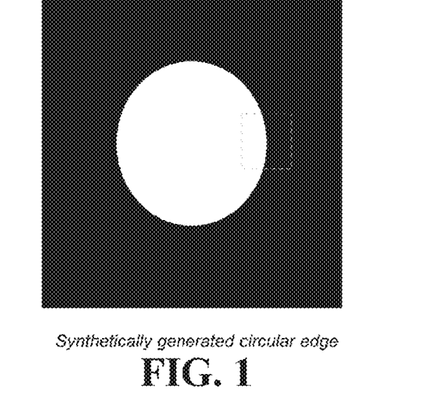
FIG. 1 shows a synthetically generated circular edge.
Figure 2:
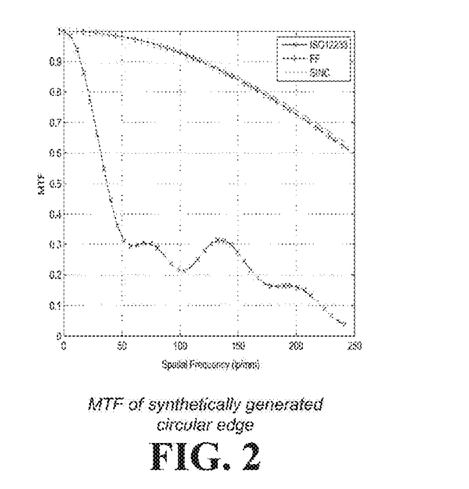
FIG. 2 shows MTF calculations of the highlighted portion of FIG. 1 according to an embodiment of the disclosed subject matter and other MTF calculations according to the ISO 12233 algorithm as well as the correct MTF curve (SINC), which is known, since the edge in FIG. 1 is a perfect edge.

FIG. 1 shows a synthetically generated circular edge and FIG. 2 shows the results of the disclosed FF algorithm, how it compares to the ISO12233 standard, and how it compares to the theoretically expected MTF value of sinc($xf_x$)=sin ($\pi xf_x$)/$\pi xf_x$. Note that $f_x$ is spatial frequency and x is pixel sampling distance. As can be seen, the ISO12233 standard produces inaccurate results based on the circular edge while the disclosed FF algorithm provides a significant improvement over the ISO12233 standard with a measurement that closely mirrors the theoretical value.

Figure 3:
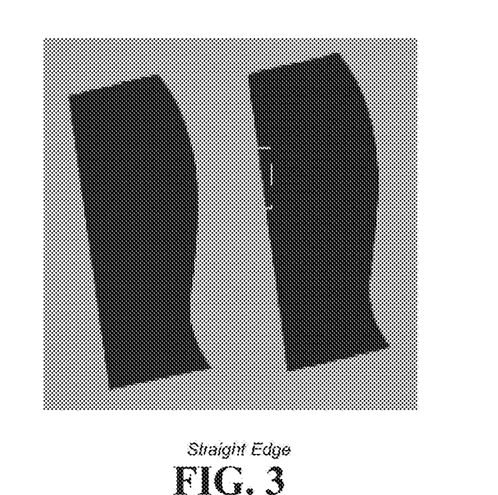
FIG. 3 shows an image collected from a digital single-lens reflex (DSLR) camera.
Figure 4:
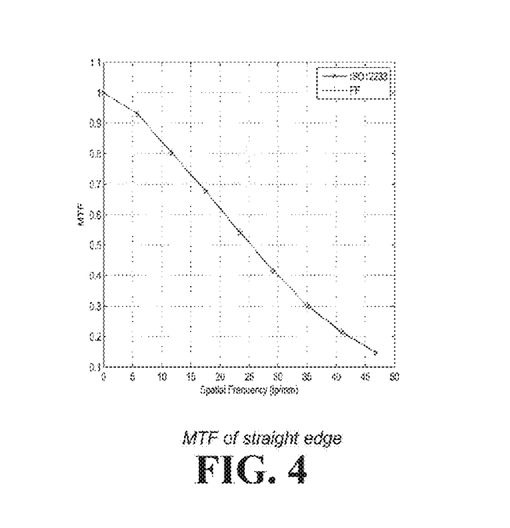
FIG. 4 shows MTF calculations of the highlighted portion of FIG. 3 according to an embodiment of the disclosed subject matter and MTF calculations according to the ISO12233 standard.

FIG. 3 shows an image collected from a DSLR camera. The gray box in this image shows a tilted straight edge used to calculate the MTFs shown in FIG. 4. In this case the ISO 12233 standard is workable due to the presence of the straight edge in the image. Both the ISO 12233 standard and the disclosed FF algorithm result in the same measurements.

Figure 5:
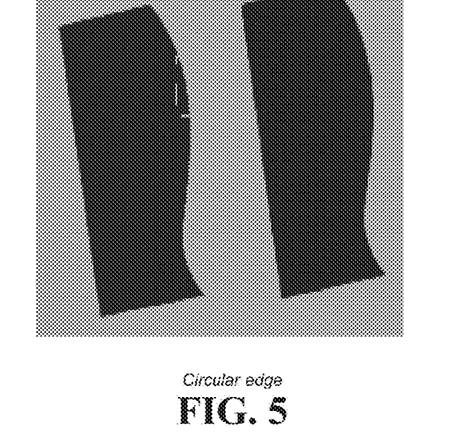
FIG. 5 shows the image collected from the digital single-lens reflex (DSLR) camera.
Figure 6:
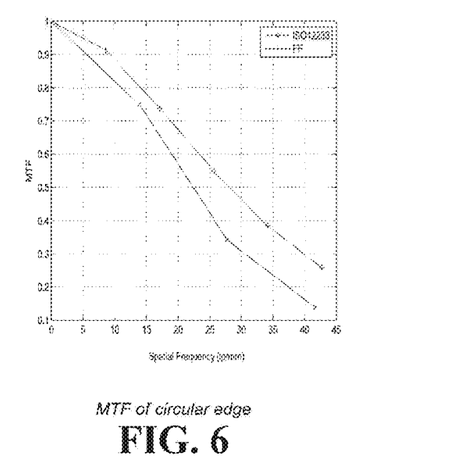
FIG. 6 shows MTF calculations of the highlighted portion of FIG. 5 according to an embodiment of the disclosed subject matter and MTF calculations according to the ISO12233 standard.

FIG. 5 show another image collected from the same DSLR. The gray box in this image shows a convex edge that represents a distorted straight edge. The MTFs calculated from this edge are shown in FIG. 6. Here, the slight distortion of the edge results in a difference between ISO12233 standard MTF calculations of the optical system and the disclosed FF algorithm calculations.

Figure 7:
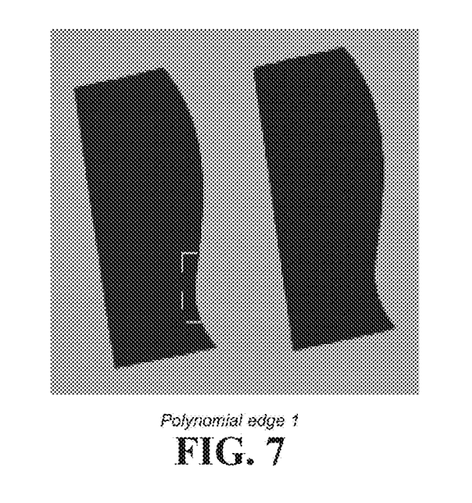
FIG. 7 shows the image collected from the digital single-lens reflex (DSLR) camera.
Figure 8:
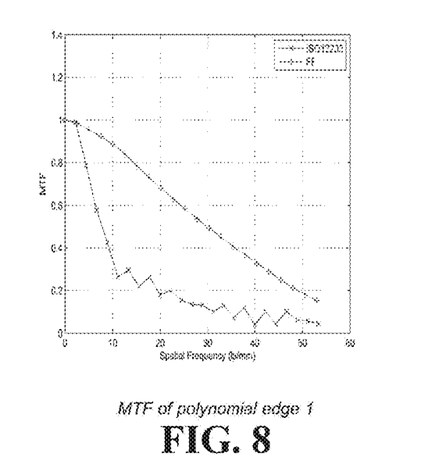
FIG. 8 shows MTF calculations of the highlighted portion of FIG. 7 according to an embodiment of the disclosed subject matter and MTF calculations according to the ISO12233 standard.

FIG. 7 show another image collected from the same Canon DSLR. The gray box in this image shows a concave edge that represents a distorted straight edge. The MTFs calculated from this edge are shown in FIG. 8. As can be seen, the ISO 12233 standard is not suitable for making an MTF determination based on the concave edge, while in contrast the disclosed FF algorithm produces consistent and more accurate results.

Figure 9:
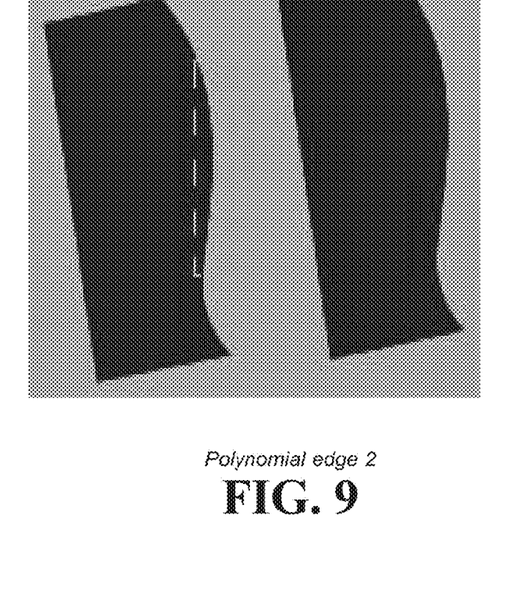
FIG. 9 shows the image collected from the digital single-lens reflex (DSLR) camera.
Figure 10:
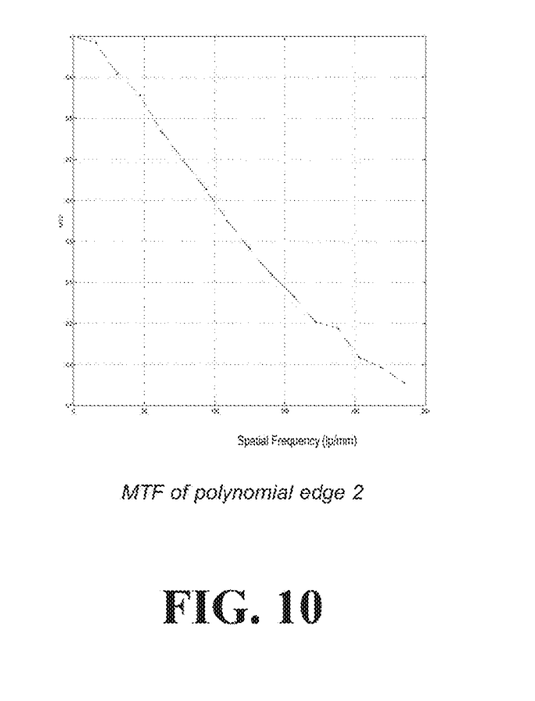
FIG. 10 shows MTF calculations of the highlighted portion of FIG. 9 according to an embodiment of the disclosed subject matter.

FIG. 9 shows another image collected from the same DSLR camera. The gray box in this image shows a polynomial edge that represents a distorted straight edge. The MTF of this edge calculated by the FF algorithm is shown in FIG. 10. Note that the disclosed FF algorithm provides a solution for evaluating the optical system here even though the conventional ISO12233 standard did not produce a result for this edge at all.

An "MTF50" sensitivity is defined herein as the spatial frequency where the MTF is equal to 0.5, and sensitivity is defined as the standard deviation divided by the mean of the statistic we are measuring. In FIG. 1 the calculated MTF50 sensitivity to edge selection, i.e. if the dotted-line box is moved up or down by a few 10's of rows, is approximately 5% for both the disclosed FF algorithm and the ISO12233 standard. However, the ISO12233 standard underestimates the MTF50 by a magnitude of approximately 6 times.

In FIGS. 3, 5, 7 and 9, i.e. representations of images captured with a DSLR camera using a high end fisheye lens, the sensitivity to edge selection for the disclosed FF algorithm is less than 5% while the variation for the conventional ISO12233 standard is more than 51%. In addition, the ISO12233 standard underestimates MTF50 by a magnitude of around 1.6 times. For many edges ISO12233 did not produce a result. The problematic failure of the ISO12233 standard to produce consistent, accurate results in these types of images is overcome by the improvements of the disclosed FF algorithm.

The disclosed FF algorithm can be used to estimate system MTF even for complexly distorted images including arbitrary smooth edges. This allows the MTF of optical systems to be characterized across the field of view. Furthermore, the disclosed algorithm is consistent across straight and distorted sample images, achieving the same results as the ISO12233 standard on straight edges.

The disclosed FF algorithm is more robust to low light, i.e. low signal to noise ratio (SNR), images than the ISO12233 standard. The disclosed FF algorithm is also more robust to noise in the image than the ISO12233. The algorithm can be improved at handling noise by using a Canny-like edge estimation algorithm or other edge detection algorithm that decreases the amount of noise in an image and reduces the image data set.

Since MTF is one of the best tools available to quantify the imaging performance of an optical system, knowing the MTF of each lens and sensor within a system allows a designer to make the appropriate selection, for example, when optimizing for a particular resolution. A wide field of view (WFOV) system designer can now determine MTF using the disclosed FF algorithm in various configurations and accurately select the combination provides the desired results.

Figure 11:
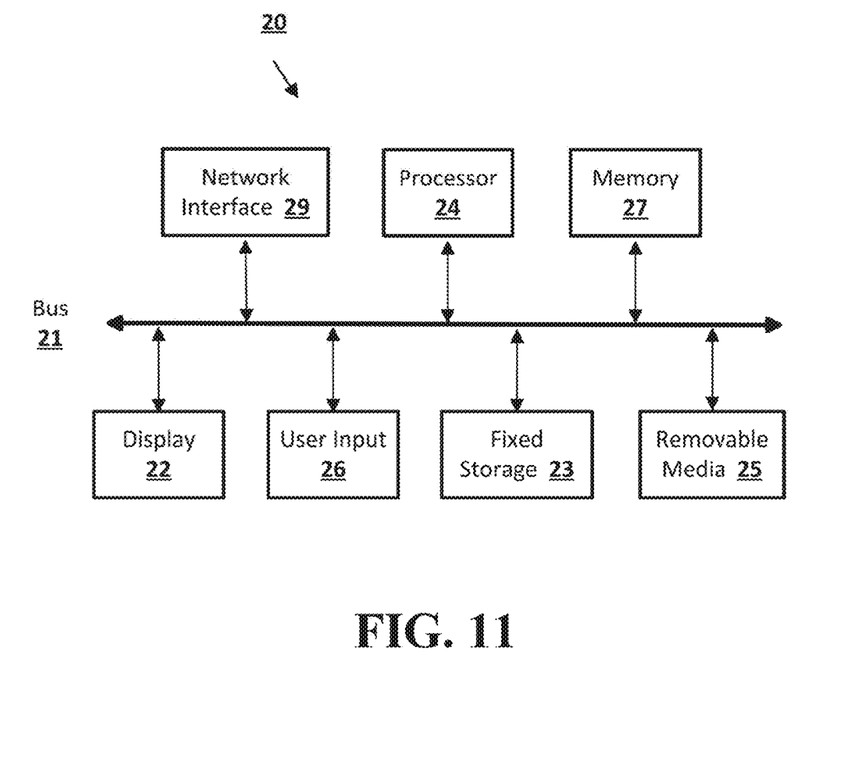
FIG. 11 shows a computing device according to an embodiment of the disclosed subject matter.

Embodiments of the presently disclosed subject matter may be implemented in and used with a variety of component and network architectures. FIG. 11 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which instructions, an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium. The central processor 24 can execute instructions stored on the one or more memory components. The instructions can include operations described above regarding the disclosed FF MTF algorithm.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method of determining an optical system modulation transfer function (MTF) based on an image captured through the optical system, comprising:
    receiving an image captured through the optical system;
    performing edge detection on columns or rows in the image to calculate a plurality of edge points;
    calculating a plurality polynomials to fit to the calculated edge points, each of the plurality of polynomials varying in degree;
    selecting a polynomial from the plurality of polynomials to represent the detected edge by:
        determining a residual error value for each of the plurality of polynomials;
        determining a difference in the residual error value between each of the plurality of polynomials; and
        selecting a highest degree polynomial among the plurality of polynomials that results in decrease in the residual error value less than a threshold amount;
    estimating the MTF based on the selected polynomial; and
    configuring a configuration of the optical system based on the estimated MTF.

2. The method of claim 1, wherein the selected polynomial has a
    degree higher than a second degree.

3. The method of claim 2, further comprising binning the edge point data such that the line spread function has a resolution that is at least four times higher than original data from the image.

4. The method of claim 1, wherein estimating the MTF comprises:
    creating a line spread function based on the selected polynomial; and
    binning edge point data of the line spread function.

5. The method of claim 1, wherein the edge is a concave edge.

6. The method of claim 1, wherein the edge is a circular edge.

7. The method of claim 1, wherein the edge is an arbitrary smooth edge.

8. A system, comprising:
    a memory storing instructions;
    a processor configured to execute a process on a digital image captured by an optical system based on the instructions, the process including the operations of:
    an image captured through the optical system;
    performing edge detection on columns or rows in the image to calculate a plurality of edge points;
    calculating a plurality polynomials to fit to the calculated edge points, each of the plurality of polynomials varying in polynomial degree;
    selecting a polynomial from the plurality of polynomials to represent the detected edge by:
        determining a residual error value for each of the plurality of polynomials;
        determining a difference in the residual error value between each of the plurality of polynomials; and
        selecting a highest degree polynomial among the plurality of polynomials that results in decrease in the residual error value less than a threshold amount;
        estimating the MTF based on the selected polynomial; and
    configuring a configuration of the optical system based on the estimated MTF.

9. The system of claim 8, wherein the selected polynomial has a
    degree higher than a second degree.

10. The system of claim 8, wherein the operation of estimating the MTF comprises:
    creating a line spread function based on the selected polynomial; and
    binning edge point data of the line spread function.

11. The system of claim 10, the process further comprising binning the edge point data such that the line spread function has a resolution that is at least four times higher than original data from the image.

12. The system of claim 8, wherein the edge is a concave edge.

13. The system of claim 8, wherein the edge is a convex edge.

14. The system of claim 8, wherein the edge is a circular edge.

15. The system of claim 8, wherein the edge is an arbitrary smooth edge.

16. A system, comprising:
a memory storing instructions;
a processor configured to execute a process on a digital image captured by an optical system based on the instructions, the process including the operations of:
receiving the digital image captured by the optical system;
performing edge detection on columns or rows in the digital image to calculate a plurality of edge points;
calculating a current polynomial to fit to the calculated edge points;
determining a residual error value for the current polynomial;
performing a polynomial selection process by:
calculating a next polynomial to fit to the calculated edge points, the next polynomial having a greater polynomial degree than the current polynomial;
determining a residual error value for the next polynomial;
in response to a difference in the residual error values of the current and next polynomials being less than a threshold amount, selecting the current polynomial and ending the polynomial selection process; and
in response to the difference being greater than or equal to the threshold amount, assigning the next polynomial as the current polynomial and repeating the polynomial selection process;
estimating the MTF based on the selected polynomial; and
configuring a configuration of the optical system based on the estimated MTF.

* * * * *